D. D. BELL.
Potato-Digger.
No. 8,574.  Patented Dec. 9, 1851.
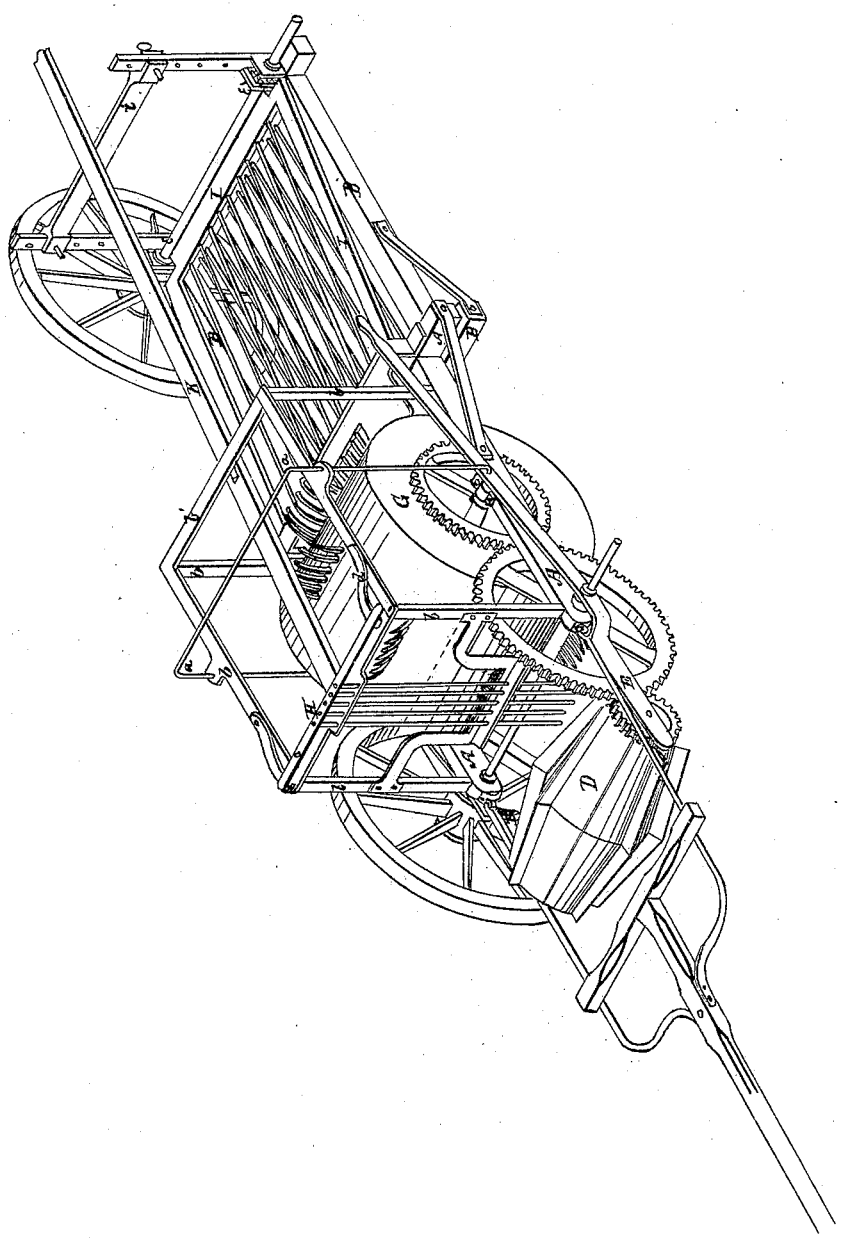

UNITED STATES PATENT OFFICE.

DANIEL D. BELL, OF WAWARSING, NEW YORK.

IMPROVEMENT IN POTATO-DIGGERS.

Specification forming part of Letters Patent No. 8,574, dated December 9, 1851.

*To all whom it may concern:*

Be it known that I, DANIEL D. BELL, of Wawarsing, in the county of Ulster and State of New York, have invented a new Machine for Digging Potatoes, &c.; and I do hereby declare the following to be a full, clear, and exact description of the same, reference being had to the annexed drawing, making a part of this specification, in which the figure is a view in perspective of my machine.

My invention consists in a machine for digging potatoes from the field by horse or other power. In the old methods of harvesting the loss is very considerable, as the potatoes after being plowed up are still commingled with the earth to such a degree that the ground must be gone over several times in order to secure a fair proportion. A very considerable number are always left scattered about, as more minute gathering would not pay for the time consumed in effecting it.

My machine consists of a frame-work supported on four wheels. Upon this, in the first place, is a cutting-cylinder to cut off the tops. A digging-cylinder follows, which throws the potatoes up out of the ground mixed with the earth, stubble, &c., to some degree, and discharges the whole upon a set of riddles or other sifting arrangements, by which the dirt is separated and the clear potatoes discharged at the back end into a trough, or are allowed to fall back upon the ground completely divested of dirt and stalks, whence they are easily gathered into the cart following the machine.

The machine is constructed as follows: A frame-work of two parts is first formed, on which all the working parts are supported, A representing the front frame and B the back frame. These two frames are attached together by a bolt similar to a king-bolt in a common wagon. All the wheels are connected to the axles, so that the axle will revolve with them. The revolution of the fore wheels gives motion to the cutting-cylinder and digging-cylinder before mentioned, and the rotation of the hind wheels gives motion to shake the riddles or sieves.

The cutting-cylinder is seen at D. It is a drum shaped like two frusta of cones joined at their larger bases. Upon this a series of blades is put parallel to each other, as shown. A pinion gearing into a spur-wheel upon the axle of the fore wheels gives it motion as the machine travels along. The blades cut off the roots by two motions—viz., that caused by the onward motion of the machine and also by the rotary motion of the cutting-cylinder. The cutting-cylinder is supported upon two arms or levers, E E, having their fulcra coincident with the fore axle, as shown. A bent bar, $a$, passing over the top, connects the two ends together, so that by operating this end of the levers or arms the cutting-cylinder can be elevated or depressed as may be required.

At G is the digging-cylinder. On the circumference a series of forks are arranged, as shown. The number of teeth in the forks, as well as the velocity of the cylinder itself, is so calculated that all the potatoes will be taken up and thrown over upon the riddles. Immediately over the digging-cylinder a platform is raised, supported upon four posts and cross-pieces, $b$. The top flooring is removed in order to show other parts. Upon this platform the driver stands.

H represents a series of bars placed between the cutting and digging cylinders. They are movable up and down by a cross-bar, $c$, and springs $d$. When they are to be used the driver puts his feet upon the bar $c$ and presses all the bars down, the pointed ends going to the ground. The use of these is to catch anything which the driver may see in the path of the machine calculated to interfere with the digging-cylinder.

I are the riddles, the top one shown inclined toward the back. They are agitated by cams or other suitable projections at $e$ upon the back axle.

It was before remarked that the two frames A and B were kept together by a king-bolt, so that instead of the fore axle turning, as is usual, the bend for turning is formed here. It is evident that some other means must be employed to sustain the frame, as otherwise the strain from the weight would bend or break the bolt and the frame would sag to the ground. It is intended that there shall be more than one movement here, for, besides turning around, the frame can be raised or lowered within certain limits. The supporting of the frame and the raising or lowering are effected by connecting the two parts by a rigid support or pole extending over the whole. This pole is seen at K, and is attached to the forward cross-piece of the platform $b$ by a bolt. The back end rests upon a cross-bar, $i$, which bar is capable of being raised or lowered on the two vertical supports shown. The cross-bar $b'$ then becomes the fulcrum, and it will be seen that the whole weight of the two inner ends of the frame A B is sustained by the cross-bar $b'$ and the pole K, the king-bolt keeping the two parts together and the other supporting the weight. The raising or lowering of the back end of the pole K gives the whole adjustment referred to—viz., the up-and-down motions—and these are very important, for by lowering the movable end of the pole K the depth of immersion of the forks of the digging-cylinder is increased, and, vice versa, by raising it that also is raised out of the ground. The permanent set is made by the bar $i$; but an attendant following the machine can, in the case of any obstruction, raise the cylinder as may be required to clear it. The raising or lowering of the digging-cylinder, however, slightly acts upon the cutting-cylinder. This, however, is kept at the proper adjustment by the driver standing upon the staging, who raises or lowers the bar $a$ as required.

In operation the machine is drawn over the hills or rows according to the manner in which the potatoes were planted, the forks in the digging-cylinder being set so as to take up an entire hill in the distance passed over. It should be remarked that in turning, the pole K being hinged at the front end, the free movement of the two parts is not affected, as the bar $b'$ slides along over a friction-roller placed in the pole, as shown.

What I claim as of my own invention, and desire to secure by Letters Patent of the United States, is—

The arrangement and combination of the cutting and digging cylinders with riddles, in the manner herein set forth.

DANIEL D. BELL.

Witnesses:
S. H. MAYNARD,
JOHN H. KILSBY, Jr.